United States Patent [19]

Laros

[11] Patent Number: 4,931,190
[45] Date of Patent: Jun. 5, 1990

[54] FLOCCULATING AGENT COMBINATIONS FOR MINERAL SLIME FILTRATION SYSTEMS

[75] Inventor: Timothy J. Laros, Salt Lake City, Utah

[73] Assignee: Envirotech Corporation, Menlo Park, Calif.

[21] Appl. No.: 290,648

[22] Filed: Dec. 27, 1988

[51] Int. Cl.$^5$ .............................................. C02F 1/56
[52] U.S. Cl. .................................... 210/710; 210/714; 210/728; 210/732; 210/734; 210/783; 210/907; 209/5
[58] Field of Search ............... 210/710, 725, 727, 728, 210/732, 734, 806, 907, 783, 714; 209/5

[56] References Cited

U.S. PATENT DOCUMENTS

| | | | |
|---|---|---|---|
| 3,020,231 | 2/1962 | Colwell et al. | 210/732 |
| 3,680,698 | 8/1972 | Liu et al. | 210/907 |
| 4,248,708 | 2/1981 | Wilson | 210/728 |
| 4,251,363 | 2/1981 | Chamberlain et al. | 210/728 |
| 4,303,532 | 12/1981 | Smelley et al. | 210/732 |
| 4,402,834 | 9/1983 | Bastgen et al. | 210/806 |

Primary Examiner—Peter Hruskoci
Attorney, Agent, or Firm—Trask, Britt & Rossa

[57] ABSTRACT

An improved method for dewatering thin slurries of very fine clay or clay-like material to yield high solids content filter cake, for example, 40% solids and greater, by the use of flocculating agent combinations involving polyethylene oxide-type flocculating agents and polyacarylamide-type flocculating agents. The method generally involves admixing the combination of flocculating agents with the slurry, dewatering the slurry by means of a mechanical dewatering apparatus and feeding the thickened slurry to a belt press filter.

8 Claims, 1 Drawing Sheet

FLOCCULATING AGENT COMBINATIONS FOR MINERAL SLIME FILTRATION SYSTEMS

BACKGROUND OF THE INVENTION

Field: The instant invention relates to filtration techniques useful in filtering thin slurries of clay or mineral slimes, such as those derived from the mining of phosphate ores, bauxite, and talc or those involving in drilling muds by the addition of selected quantitative combinations of certain flocculating agents.

State of the Art: The dewatering of various types of mineral tailing slimes has been the subject of continual investigation since disposal represents a significant problem to various types of industries. Phosphate mining, for example, produces clay tailing slurries or slimes which have a low content of solids, for example, usually less than about 10%, which must be economically dewatered to a solids content of at least about 40% to be effectively returned to a mine site. The solids content of such slimes is composed of particles having an average particle size less than about 50 microns and often less than 25 microns. Slimes are generally characterized as aqueous suspensions of siliceous and clay solids including minor quantities of other minerals. Generally, slime dewatering techniques have yielded solids contents of only about 20%. Ponding has continued to be used to dispose of these tailing materials. Ponding, however, requires large acreages of land to dewater effectively the large volume of such slurries being produced. Because of environmental, economic, aesthetic and safety reasons, ponding is an undesirable approach to dewatering thin mineral slurries.

Recent work by the Bureau of Mines has investigated various flocculating agent combinations to increase the solids content of the dewatered slimes. Some of this work is described in *Report of Investigations* 8436, published in 1980 and entitled "Synergism and Polyethylene Oxide Dewatering of Phosphatic Clay Waste" by Smelley and Scheiner, which indicates that combinations of guar gums and polyethylene oxide (PEO) as a flocculating agent combination was superior over guar gum or PEO used singularly.

The Bureau of Mines report also referred to work with other combinations of PEO flocculating agents, with some results which indicated that synergism was apparently realized between PEO and an anionic polyacrylamide flocculating agent. The combination, however, apparently showed no superiority over PEO alone in terms of reagent economics.

The amount of guar required to reduce the requisite quantity of PEO necessary to achieve a flocculated slurry increased considerably when the PEO reduction was greater than about 50%. For example, at 2.5 pounds of guar per ton of processed slime, the PEO reduction was about 58%. An increase in the guar concentration to 5 pounds per ton reduced the PEO to 60%. However, at such a level, the cost of the guar per ton of processed slurry exceeded the cost of the polyethylene oxide when used at its usual concentration in the absence of guar.

Earlier work on the disposal problem of phosphate slimes is summarized in U.S. Pat. No. 3,680,698 of Liu et al. Liu et al. tried various coagulants by polymerizing one or more monomers in situ to form a particular polymer. While various polymers and copolymers were formed in situ by Liu et al., the use of a symbiotic or synergistic combination of distinct, separate polymers was not disclosed. The technique employed by Liu et al. produced a concentrated slime generally having a solids content of about 30% by volume (col. 5, lines 50 et seq.) although reference is made to concentrations up to 60% by weight solids (col. 6 lines 15 et seq.). The higher solids content is indicated to be achieved by mixing a sand slurry with a compacted product containing 10% or more solids.

The Liu et al. processing employed gravity dewatering apparatus, which has been conventionally used in slime processing in the phosphate industry. Such gravity separation devices are large, relatively slow operating apparatus requiring minimal attention and maintenance.

The Liu et al. coagulant system is intended to promote more rapid flocculation within these gravity water-solids separation apparatus which achieve separation of the solids from water by settling of the solid particles by agglomeration (flocculation) and settling.

While products containing in excess of 40% solids may be returned to a mine excavation as land fill, it is obviously desirable to increase the solids as high as possible while maintaining the use of flocculating agents in a range which is economic. Generally, at a solids content of 40%, mineral waste filter cakes are self-supporting.

SUMMARY OF THE INVENTION

The instant invention relates to a select combination of flocculating agents useful in low concentrations which may be used to effectively flocculate mineral slimes containing about 3% to 8% by weight solids to facilitate dewatering said slimes to produce a filter cake having a solids content in excess of 40%, and preferably greater than about 50%, with some systems yielding filter cakes having a solids content greatly in excess of 60%.

The filter system utilized is one in which there is a gravity drainage zone involving a mechanical dewatering apparatus such as an inclined screen or a sieve bend screen to dewater the slime preliminarily before it passes to a dual belt filter press. The flocculating agents used in the instant invention are a combination of polyethylene oxide (PEO) having a molecular weight of about five million to about eight million and a high molecular weight anionic polyacrylamide. Especially good results have been obtained when the PEO is present as about 0.001% to about 0.01% by weight and the polyacrylamide is present as about 0.02% to about 0.1% by weight. Also, the addition of sand, preferably as a slurry having a solids concentration of about 20% to 30% by weight, effectively improves the filtration characteristics of the system.

DESCRIPTION OF THE INVENTION

Figure 1:
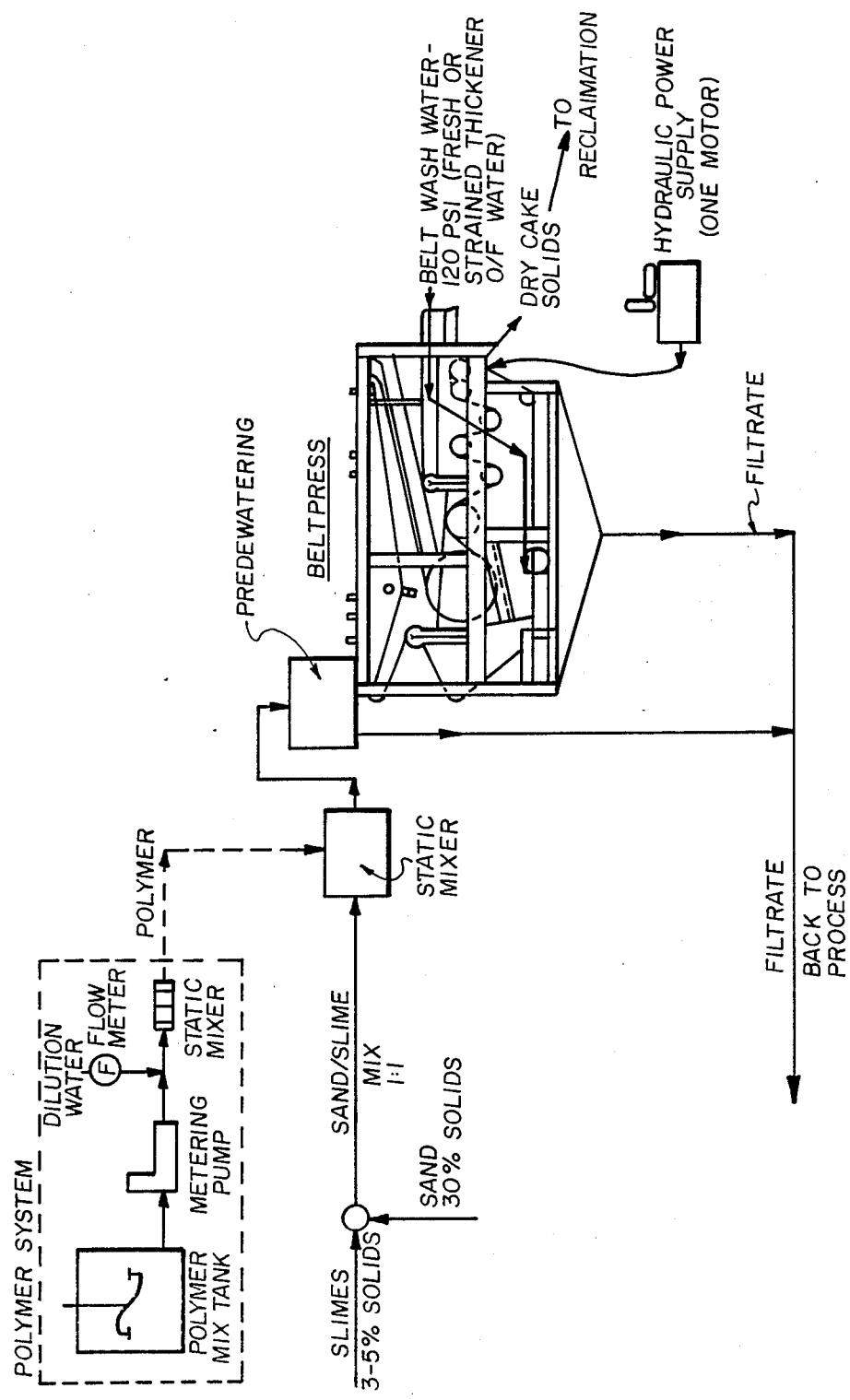
FIG. 1 is a process flow sheet illustrating in schematic representation the treatment and processing of a mineral slurry according to the techniques of the instant invention.

The instant invention relates to an improved filtering process for dewatering thin mineral slurries, often referred to as slimes, especially phosphate, bauxite, and talc slimes produced from the mining of phosphate ores, bauxite, and talc and barite-containing slimes resulting from waste well drilling muds. These slimes are generally composed of clay or clay-like solid materials or other materials such as barite. The particle size of such solids is generally less than about 150 mesh and frequently less than 200 mesh. The particle size of solid particles within a slime is generally less than 50 microns and frequently less than 25 microns. The invention further relates to an improved process for processing such mineral slurries and to a unique combination of flocculating agents which increase the solids content of the filter cake produced by the process to yield consistently a self-supporting filter cake.

The invention relates to a method of dewatering mineral slimes, particularly clay slimes having a solids concentration less than about 6% derived from phosphate processes and drilling fluids, by passing the slime through an initial mechanical dewatering apparatus, such as a sieve bend, an inclined screen or rotary screen thickener, and then to a belt press filter. A combination of flocculating agents such as a high molecular weight anionic polyacrylamide and a high molecular weight nonionic polyethylene oxide polymer are added to such slime prior to its introduction to the preliminary mechanical dewatering apparatus. Generally, the polyethylene oxide is present as about 0.001% to about 0.01% by weight and preferably from about 0.002% to about 0.008% by weight based upon the weight of the slurry. The polyacrylamide is present as about 0.02% to about 0.1% by weight and preferably from about 0.03% to about 0.08% by weight based upon the weight of the slurry.

The polyethylene oxide flocculating agents used in the instant invention are well-known in the art. Those having a molecular weight of about five million to about eight million are particularly useful in the instant invention. Typical polyethylene oxide flocculating agents are produced by Union Carbide and have been described in U.S. Pat. Nos. 3,006,872; 3,020,231; 3,184,336; and 3,551,432.

The anionic polyacrylamide flocculating agents used in the instant invention are high molecular weight materials known in the art and are readily available, for example, one particularly useful polyacrylamide being marketed under the trade name "PERCOL 725."

Further description of the invention may be facilitated by reference to the attached illustration.

At the left side of FIG. 1, a slurry or slime is shown being introduced to the process wherein the slime has a solids content of about 3% to about 5% by weight solids, although occasionally the solids content may be higher. A sand slurry having about 20% to 30% by weight solids is introduced and mixed with the slime prior to introduction to any dewatering apparatus. The sand to slime ratio is about 1:1 on a dry solids basis; that is, for every ton of dry slime, about one ton of dry sand is introduced. The sand-slime slurry is passed through a static mixing apparatus in which the flocculating agents are added.

The polymeric flocculating agents are separately admixed in polymer mix tanks, passed through separate metering pumps in which each is appropriately diluted with water, and passed through a flocculating agent static mixer before introduction to the slime static mixer which mixes the flocculating agent combination with the sand-slime slurry. Alternatively, the flocculating agents may be combined in the polymer mix tank and fed in combination to the static mixer.

The treated slurry is then preliminarily introduced to a mechanical dewatering apparatus, which may be a sieve bend or inclined screen, prior to introduction to a belt press filter. Sufficient time should be allowed after addition of the flocculating agents to permit flocculation to occur before the slurry is introduced to the mechanical dewatering apparatus. Filtrate from the mechanical pre-dewatering apparatus and filtrate from the belt press are admixed and recycled to the mining process. The dry solids cake is recovered from the belt press and transported to a land fill site. A portion of the cake produced from the filtration process can also be advantageously recycled to the feed stream in a back-mixing manner to further thicken the feed slurry to enhance the filter performance.

Various phosphate slimes were tested in accordance with the instant invention and the results of such tests are set forth in Table 1.

TABLE 1

| Sample | Phosphate Slimes | Flocculating Agent and Dosage |
|---|---|---|
| A. ESTECH 10727-60 6% Solids | 1:1 Sand/Slime Sieve Bend, 31.1% Solids Cake 56.9% Solids | 1.1 lb/T PERCOL 727 0.04 lb/T UCAR 309 |
| B. TEXAS GULF 10838-14 5.5% Solids | 1:1 Sand/Slime Sieve Bend, 27.6% Solids Cake 61.1% Solids | 0.7 lb/T PERCOL 725 0.24 lb/T UCAR 309 |
| C. AGRICO 10838-29 7.0% Solids | 1:1 Sand/Slime Sieve Bend, 35.5% Solids Cake 64.4% Solids | 0.02 lb/T UCAR 309 1.0 lb/T PERCOL 727 |

In Table 1, the sieve bend concentration indicates the percent solids present in the material (solids enhanced slurry) leaving the sieve bend and being introduced to the belt press filter, while the cake solids content figure is for that product which exits the belt press tilter as filter cake.

Sieve bend apparatus with a pore size of about 0.02 to 0.04 inches works effectively in the instant invention. The solids content of the filtrate from a sieve bend filter utilized in the instant invention may range from about 0.7% by weight to about 1% by weight.

With the ESTECH material, that is, Sample A, a comparison filtration was conducted using only UCAR 309 polyethylene oxide in the amount of about 0.60 pounds per ton, which yielded a filter cake with a solids content of about 48%. However, UCAR 309 alone in an amount of about 1.2 pounds per ton did not work with the TEXAS GULF material, nor did it work with the AGRICO material. Also, it has generally been observed that either lime or gypsum must be present in the slime in order for polyethylene oxide to work alone to yield consistently a filter cake having a significant solids content. It should be observed that the use of polyethylene oxide alone with respect to Sample A did include a sand slurry of about 25% by weight solids in a wet ratio of about 0.5 sand slurry to 1.0 slime slurry. In the tests on the TEXAS GULF and AGRICO material utilizing only a PEO flocculating agent, the sand slurry was present in a 1:1 ratio on a dry solids basis.

Although in the above table the sand slurry was generally introduced in a ratio of about 1:1 on a dry basis wherein the sand was present in the slurry as about a 20% to 30% by weight solids, the sand may be utilized in different slurry ratios, although generally the slurry concentration is preferred to be in the range of about 20% to 30% by weight of sand. However, quantities of the sand slurry may be utilized from about 10% of that of the slime up to 100% (the 1:1 ratio used in the tests reported in Table 1) to a predominance of the sand slurry. However, since it is desired to pass as much of the slime through the system as possible, it is generally preferred that the sand slurry not be used in excess of about a 1:1 ratio on a dry basis with respect to that of the dry slime.

The presence of sand in the slurry appears to assist greatly in rapid dewatering of the slurry in belt press filters having conventional woven filter cloths. However, small additions may generally not be used when a belt filter medium is used on the filter cloth of the belt press filter.

Although the concentration of flocculating agents respectively may be set forth within the concentrations indicated hereinabove, generally the polyacrylamide material will predominate and will generally be used in a weight ratio of about 2:1 to about 25:1 of polyacrylamide to polyethylene oxide. While traditionally polyethylene oxide used alone is present as at least 1.5 pounds per ton of processed slime, in the instant invention the total combination of flocculating agents is generally no more than a total of about 1.2 pounds of flocculating agent per ton of slime. Frequently, the total amount of combined flocculating agents is less than one pound per ton of slime processed. Thus, the total quantity of flocculating agent utilized is reduced by practicing the instant invention, while the solids content of the resulting filter cake has been observed to increase considerably.

The instant invention is particularly advantageous in that a synergistic combination of flocculating agents are used in conjunction with a filtration processing system in contract with a gravity settling processing system.

In the instant process, a synergistic combination of coagulants or flocculating agents is introduced in a slime having a very low solids content, e.g., 3 to 5% by weight solids. After mixing of the flocculating agents with the slime, mechanical dewatering occurs, which may increase the solids content significantly prior to introduction of the dewatered slime to a belt press filter.

Preferably, in the practice of the invention, sand is added, as a dilute slurry, to the slime prior to any treatment with a coagulating or flocculating agent. While the processing of additional solids through the liquid-solids separation system would be expected to slow down the separation process or cause a significant increase in the size of the separation apparatus, such is not the case. Also, the presence of sand during the addition of flocculating agents has been preferred.

While processes such as those described by Liu et al. involve the preferential addition of sand to the final product exiting the slime processing system, the opposite has been preferred for the coagulant mechanical processing system of the instant invention.

What is claimed is:

1. In a method of dewatering phosphate slimes containing about 3% to 8% by weight solids on a belt press filter, the improvement comprising adding to said slime prior to its introduction to said belt press filter a combination of flocculating agents comprising a high molecular weight anionic polyacrylamide and a high molecular weight nonionic polyethylene oxide flocculating agent having a molecular weight of about five million to about eight million, said polyethylene oxide flocculating agent added to be present at a concentration of about 0.001% to about 0.1% by weight and said polyacrylamide added to be present as about 0.02% to about 0.01% by weight based upon the weight of said slime, wherein the weight ratio of polyacrylamide to polyethylene oxide is about 2:1 to about 25:1, and no more than a total of about 1.2 pounds of flocculating agent per ton of slime is added, and passing said slime through a mechanical dewatering apparatus to remove free water.

2. The method of claim 1 wherein said polyethylene oxide is present in a concentration of from about 0.002% to about 0.008% by weight.

3. The method of claim 1 wherein said polyacrylamide is present from about 0.03% to about 0.08% by weight.

4. The method of claim 1 wherein said mechanical dewatering apparatus is selected from the group consisting of a sieve bend, an inclined screen, and a rotary screen thickener.

5. In a method of dewatering a clay-containing slime having a solids concentration of less than about 6% by weight by passing same first through a mechanical dewatering apparatus to remove free water and then through a belt press filter, the improvement comprising adding to said slime before it enters said mechanical dewatering apparatus a combination of flocculating agents comprising about 0.002% to about 0.008% by weight of a high molecular weight nonionic polyethylene oxide flocculating agent having a molecular weight of about five million to about eight million, and about 0.03% to about 0.08% by weight of a high molecular weight anionic polyacrylamide flocculating agent, wherein the weight ratio of polyacrylamide to polyethylene oxide is about 2:1 to about 25:1 and no more than a total of about 1.2 pounds of flocculating agent per ton of slime is added.

6. A method for dewatering thin slurries of very fine clay or clay-like particles having a solids content of less than about 10% by weight to yield filter cakes having approximately 40% by weight solids content comprising:

adding a mixture of flocculating agents to said slurries of very fine clays, said mixture consisting essentially of about 0.02% to about 0.1% by weight of high molecular weight anionic polyacrylamide flocculating agent and about 0.002% to about 0.008% by weight of a polyethylene oxide flocculating agent having a molecular weight of about five million to eight million, said weight percent being based upon the weight of slurry being treated, wherein the weight ratio of polyacrylamide to polyethylene oxide is about 2:1 to about 25:1 and no more than a total of about 1.2 pounds of flocculating agent per ton of slime is added, to form a flocculated slurry;

passing said flocculated slurry over a mechanical dewatering apparatus to remove free water and form a thickened slurry;

dewatering said thickened slurry by passing it through a dual belt press filter having felt surfaced filter belts; and collecting filter cake having a solids content of greater than about 40% by weight.

7. The method of claim 6 wherein a slurry of sand of about 20% to 30% solids is admixed with said slurries of very fine clay materials prior to or immediately after the addition of said flocculating agents.

8. The method of claim 6 wherein the slurry being flocculated is a clay or clay-like or a clay and mineral mixture used as a drilling mud or drilling fluid.

* * * * *